(12) United States Patent
Rocci et al.

(10) Patent No.: US 10,481,896 B2
(45) Date of Patent: Nov. 19, 2019

(54) CHARGER STORAGE FOR CACHED VEHICLE UPDATES

(71) Applicant: FORD GLOBAL TECHNOLOGIES, LLC, Dearborn, MI (US)

(72) Inventors: Benjamin M. Rocci, Plymouth, MI (US); Mark Anthony Rockwell, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/636,047

(22) Filed: Jun. 28, 2017

(65) Prior Publication Data

US 2019/0004784 A1    Jan. 3, 2019

(51) Int. Cl.
| | | |
|---|---|---|
| *G06F 9/445* | (2018.01) | |
| *G06F 8/65* | (2018.01) | |
| *G06F 12/0875* | (2016.01) | |
| *G06F 12/0877* | (2016.01) | |
| *G06F 13/36* | (2006.01) | |
| *B60L 53/14* | (2019.01) | |

(Continued)

(52) U.S. Cl.
CPC ............... *G06F 8/65* (2013.01); *B60L 53/14* (2019.02); *B60L 53/60* (2019.02); *G06F 12/0875* (2013.01); *G06F 12/0877* (2013.01); *G06F 13/36* (2013.01); *B60L 2240/70* (2013.01); *G06F 8/33* (2013.01); *G06F 8/433* (2013.01); *G06F 8/71* (2013.01); *G06F 2212/60* (2013.01)

(58) Field of Classification Search
CPC ...... G06F 8/33; G06F 8/65; G06F 8/71; G06F 8/433; G06F 12/0875; G06F 12/0877; G06F 13/36; B60L 53/14; B60L 53/60
See application file for complete search history.

(56) References Cited

U.S. PATENT DOCUMENTS

2008/0300775 A1 * 12/2008 Habaguchi ....... G08G 1/096716
  701/116
2014/0109075 A1 * 4/2014 Hoffman ............. G06F 8/65
  717/169

(Continued)

FOREIGN PATENT DOCUMENTS

WO    2016142101 A1    9/2016

OTHER PUBLICATIONS

Marco Steger et al., CESAR: A Testbed Infrastructure to Evaluate the Efficiency of Wireless Automotive Software Updates, ACM, 2017, retrieved online on Jul. 15, 2019, pp. 311-315. Retrieved from the Internet: <URL: http://delivery.acm.org/10.1145/3130000/3127580/p311-steger.pdf?>. (Year: 2017).*

(Continued)

*Primary Examiner* — Hanh Thi-Minh Bui
(74) *Attorney, Agent, or Firm* — Michael J. Spenner; Brooks Kushman P.C.

(57) ABSTRACT

Responsive to a powerline connection of a vehicle to electric vehicle supply equipment (EVSE), vehicle version information is received indicative of whether the vehicle requires software updates that are downloaded to a non-transitory storage. If so, the software updates are sent to the vehicle over the powerline connection. If not, the software updates are requested over a wide-area connection to a remote server to be cached in the storage for use in subsequent vehicle powerline connections.

15 Claims, 3 Drawing Sheets

(51) Int. Cl.
*B60L 53/60* (2019.01)
*G06F 8/71* (2018.01)
*G06F 8/41* (2018.01)
*G06F 8/33* (2018.01)

(56) References Cited

U.S. PATENT DOCUMENTS

2016/0107532 A1* 4/2016 Park .................... B60L 11/1838
   701/22
2018/0101377 A1* 4/2018 Wingate, Jr. .............. G06F 8/65
2018/0359144 A1* 12/2018 Malaspina ................ G06F 8/65

OTHER PUBLICATIONS

Dip Goswami et al., Model-Based Development and Verification of Control Software for Electric Vehicles, ACM, 2013, retrieved online on Jul. 15, 2019, pp. 1-9. Retrieved from the Internet: <URL: http://delivery.acm.org/10.1145/2490000/2488853/a96-goswami.pdf?>. (Year: 2013).*

* cited by examiner

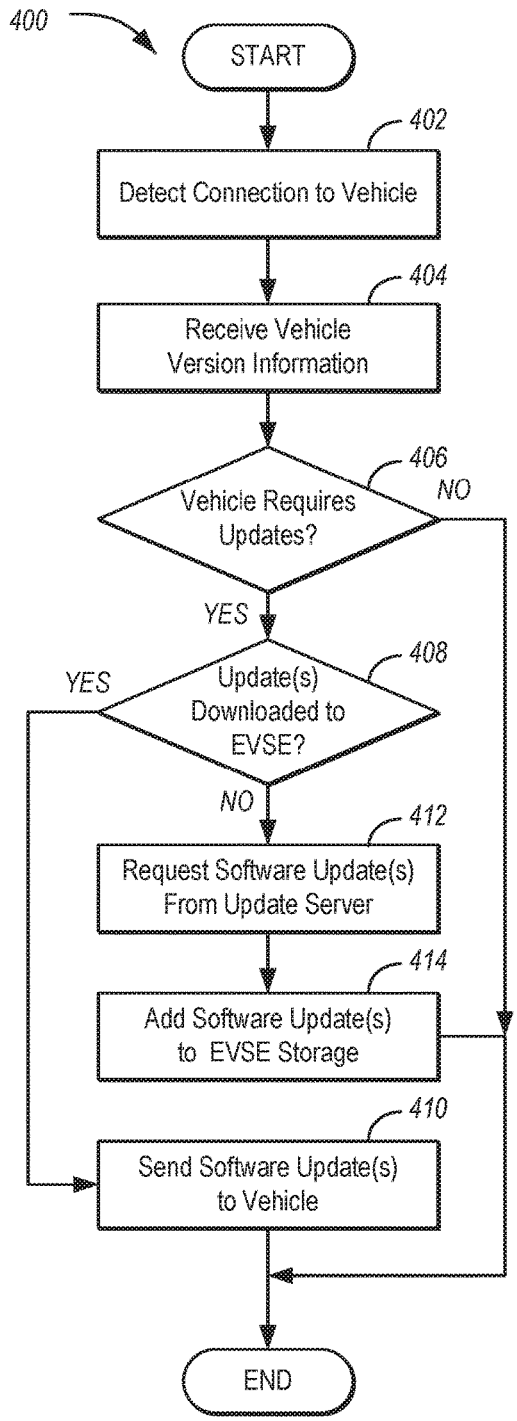
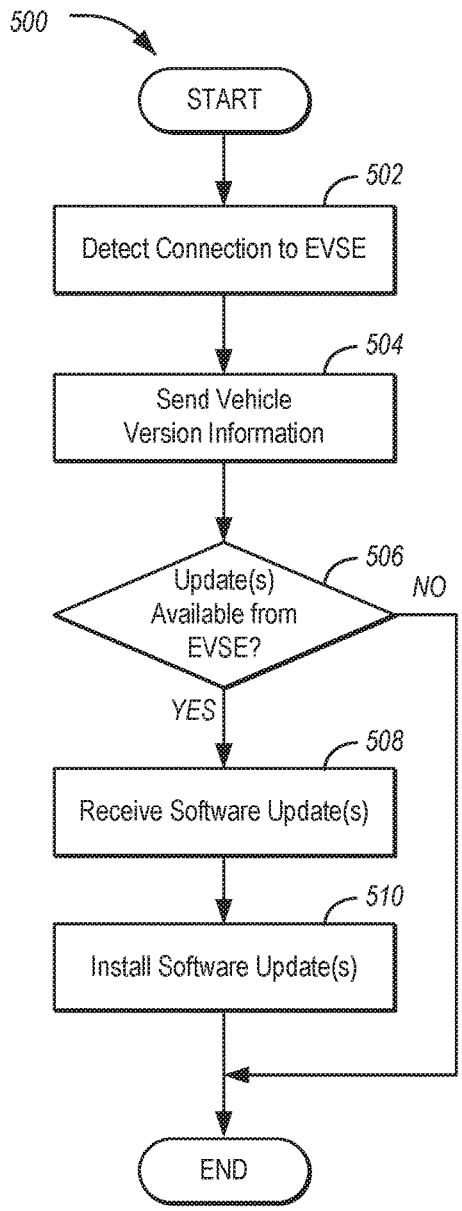
FIG. 4
FIG. 5

CHARGER STORAGE FOR CACHED VEHICLE UPDATES

TECHNICAL FIELD

Aspects of the disclosure generally relate to a charger cache for storage of vehicle updates.

BACKGROUND

Electric or hybrid electric vehicles may be charged at a relatively slow rate from conventional power outlets or at a relatively fast rate from dedicated vehicles chargers. To receive power from vehicle chargers or other types of electric vehicle supply equipment (EVSE), the electric vehicle may be required to be physically connected to and electronically associated with the EVSE. In some cases, the EVSE may perform authentication of the electric vehicle, both to ensure the vehicle is authorized to use the charger and also to bill the vehicle for charger time or energy dispensed.

Over-the-air (OTA) software updates can be slow or unreliable, as such updates are subject to the speed and signal strength of the wireless network over which they are received. Depending on the OTA update method or strategy, the time it takes for an update to download and be installed may cause the customer inconvenience.

SUMMARY

A system includes a non-transitory storage and a processor. The processor is programmed to, responsive to a powerline connection of a vehicle to EVSE, receive vehicle version information indicative of whether the vehicle requires software updates that are downloaded to the storage. If so, the software updates are sent to the vehicle over the powerline connection, and if not, the software updates are requested over a wide-area connection to a remote server to be cached in the storage for use in subsequent vehicle powerline connections.

A vehicle includes a processor programmed to, responsive to vehicle association to EVSE over a powerline connection, receive a first charge of a traction battery, send version information over the connection to cause the EVSE to download software updates to EVSE storage, reconnect to the EVSE to receive a second charge of the traction battery, and receive the software updates from the storage via the connection during the second charge.

A method includes, responsive to a powerline connection of a vehicle to EVSE for charging of the vehicle and receiving vehicle version information indicative of whether the vehicle requires software updates, requesting the software updates over a wide-area network to a remote server to be cached in a non-transitory storage of the EVSE for providing to vehicles during subsequent vehicle powerline connections.

BRIEF DESCRIPTION OF THE DRAWINGS

FIG. 4 illustrates an example process for providing cached software updates from the EVSE to the vehicle; and FIG. 5 illustrates an example process for receiving cached software updates from the EVSE by the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Fully electric and plug-in hybrid vehicles require extended periods of charge time and are typically connected to a charger overnight. The vehicle to charger connection may accordingly present a unique opportunity to utilize a physical connection of the charger to the vehicle to communicate software updates to the vehicle.

The charger may communicate with a cloud-based software update server via wired or wireless Internet connection. Responsive to vehicle connection to the charger, the charger queries the vehicle for current software level information and sends this information to the update server. If the update server recognizes that the vehicle is eligible for one or more updates, the update server sends those updates to the charger for storage until a future vehicle charging event. Responsive to occurrence of the future vehicle charging event, the software update will already be stored locally at the charger and the update will be downloaded to the vehicle over the vehicle-charger physical connection.

By use of the vehicle-charger physical connection, software updating of the vehicle may be accomplished with minimal down time for the customer and no loss of connectivity features or functionality during the update. Moreover, as the software updates are stored locally, such a procedure is significantly faster and more reliable than wireless to vehicle OTA methods. Moreover, the system does not require any wireless features of the vehicle. Yet further, this procedure can save costs by reducing module memory capacity on the vehicle that may otherwise be required for OTA vehicle update procedures. Further aspects of the disclosure are discussed in further detail herein.

Figure 1:
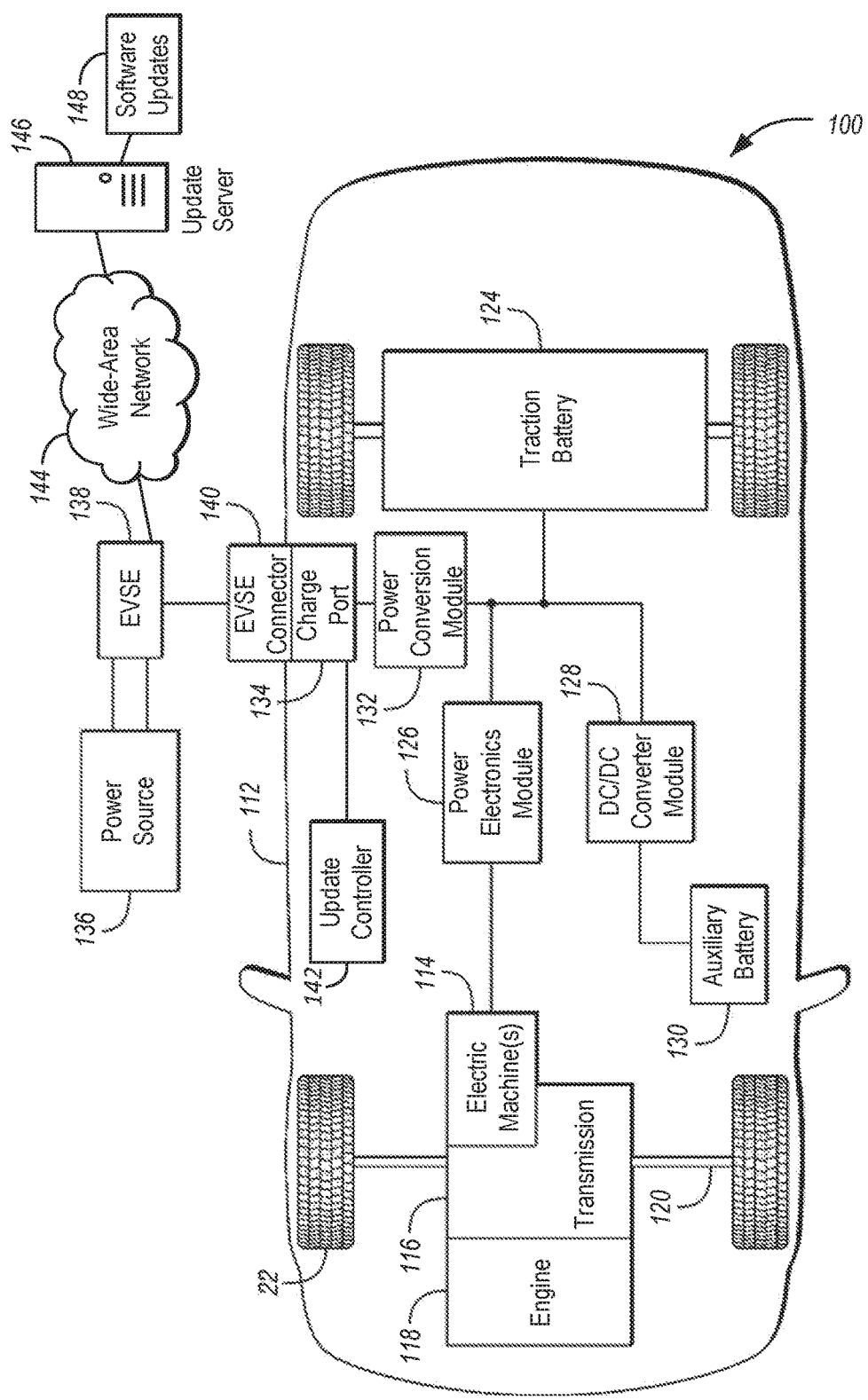
FIG. 1 illustrates a plug-in hybrid-electric vehicle, EVSE, and update server.

FIG. 1 depicts a typical plug-in hybrid-electric vehicle (HEV). A typical plug-in hybrid-electric vehicle 112 may comprise one or more electric machines 114 mechanically connected to a hybrid transmission 116. The electric machines 114 may be capable of operating as a motor or a generator. In addition, the hybrid transmission 116 is mechanically connected to an engine 118. The hybrid transmission 116 is also mechanically connected to a drive shaft 120 that is mechanically connected to the wheels 122. The electric machines 114 can provide propulsion and deceleration capability when the engine 118 is turned on or off. The electric machines 114 also act as generators and can provide fuel economy benefits by recovering energy that would normally be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery 124 stores energy that can be used by the electric machines 114. A traction battery 124 typically provides a high voltage DC output. The traction battery 124 is electrically connected to one or more power electronics modules 126. One or more contactors (not shown) may isolate the traction battery 124 from other components when opened and connect the traction battery 124 to other components when closed. The power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may require a three-phase AC current to function. The power electronics module 126 may convert the DC voltage to a three-phase AC current as required by the electric machines 114. In a regenerative mode, the power electronics module 126 may convert the three-phase AC current from the electric machines 114 acting as generators to the DC voltage required by the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A typical system may include a DC/DC converter module 128 that converts the high voltage DC output of the traction battery 124 to a low voltage DC supply that is compatible with other vehicle loads. Other high-voltage loads, such as compressors and electric heaters, may be connected directly to the high-voltage DC output without the use of a DC/DC converter module 128. The low-voltage systems may be electrically connected to an auxiliary battery 130 (e.g., a twelve Volt battery).

The vehicle 112 may be an electric vehicle or a plug-in hybrid vehicle in which the traction battery 124 may be recharged by an external power source 136. The external power source 136 may be a connection to an electrical outlet. The external power source 136 may be electrically connected to one or more EVSEs 138. (While a single EVSE 138 is illustrated in FIG. 1, it should be noted that multiple EVSEs 138 may be connected to the external power source 136.) The EVSE 138 may provide circuitry and controls to regulate and manage the transfer of energy between the power source 136 and the vehicle 112. The external power source 136 may provide DC or AC electric power to the EVSE 138. The EVSE 138 may have an EVSE connector 140 for plugging into a charge port 134 of the vehicle 112. The charge port 134 may be any type of port configured to transfer power from the EVSE 38 to the vehicle 112. The charge port 134 may be electrically connected to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling.

In addition to the transfer of energy from EVSE 138 to vehicle 112, EVSEs 138 may utilize powerline communication to provide communication capabilities with connected vehicles 112. One type of powerline communication performed between EVSEs 138 and vehicles 112 is an association procedure configured to allow EVSEs 138 and vehicles 112 to identify one another when a vehicle 112 is plugged in. The association procedure may be implemented in various ways, such as using the signal level attenuation characterization (SLAC) protocol as defined by the Home-Plug® Green PHY specification. To implement the SLAC protocol, the vehicle 112 may include an update controller 142 configured to perform a controlled sequence of requests and responses to the requests.

A wide-area network 144 may include one or more interconnected communication networks such as the Internet, a cable television distribution network, a satellite link network, a local-area network, a wide-area network, and a telephone network, as some non-limiting examples.

Figure 2:
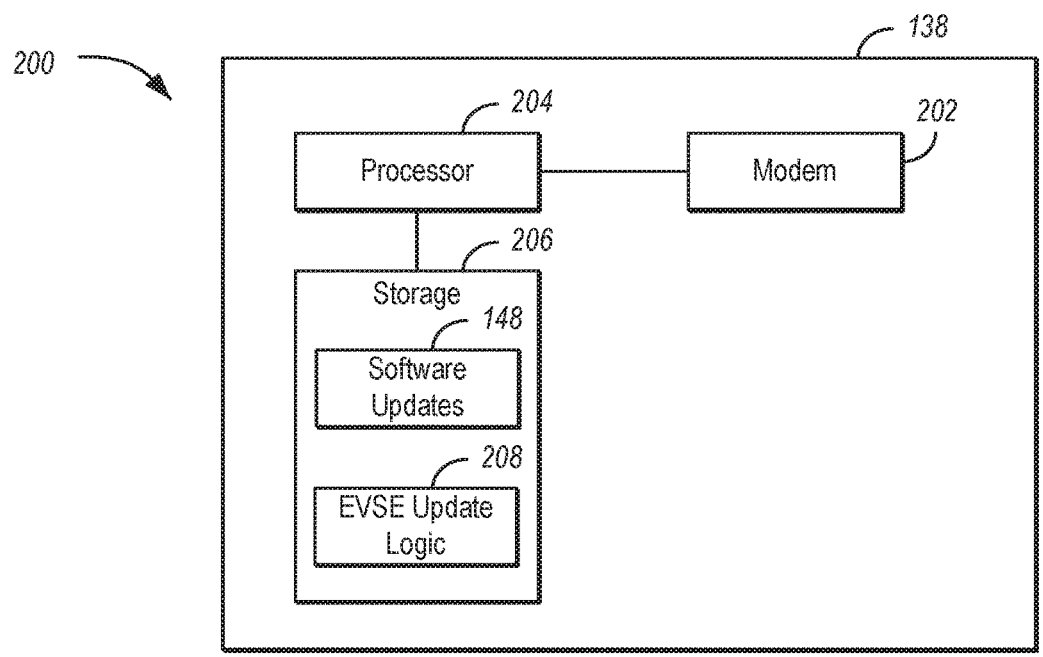
FIG. 2 illustrates further details of the EVSE.

FIG. 2 illustrates further details of the EVSE 138. As shown, the EVSE 138 may include a modem 202 or other network hardware configured to facilitate communication between the EVSE 138 and other networked devices over the wide-area network 144. As one possibility, the modem 202 may be a cellular network transceiver configured to communicate data over a cellular telephone network. As another possibility, the modem 202 may be a Wi-Fi transceiver configured to connect to a local-area wireless network to access the wide-area network 144.

The EVSE 138 may further include various types of computing apparatus in support of performance of the functions of the EVSE 138 described herein. In an example, the EVSE 138 may include one or more processors 204 configured to execute computer instructions, and a storage 206 medium on which the computer-executable instructions and/or data may be maintained. A computer-readable storage medium (also referred to as a processor-readable medium or storage 206) includes any non-transitory (e.g., tangible) medium that participates in providing data (e.g., instructions) that may be read by a computer (e.g., by the processor(s) 204). In general, a processor 204 receives instructions and/or data, e.g., from the storage 206, etc., to a memory and executes the instructions using the data, thereby performing one or more processes, including one or more of the processes described herein. Computer-executable instructions may be compiled or interpreted from computer programs created using a variety of programming languages and/or technologies including, without limitation, and either alone or in combination, Java, C, C++, C#, Fortran, Pascal, Visual Basic, Python, Java Script, Perl, PL/SQL, etc.

Referring back to FIG. 1, the update server 146 may include various types of computing apparatus, such as a computer workstation, a server, a desktop computer, a virtual server instance executed by a mainframe server, or some other computing system and/or device. Similar to the EVSE 138, the update server 146 generally includes a memory on which computer-executable instructions may be maintained and where the instructions may be executable by one or more processors (not shown for clarity). Such instructions and other data may be stored using a variety of computer-readable media. In an example, the update server 146 may be configured to maintain software updates 148 to be provided to the vehicles 112.

Referring to FIG. 2, the EVSE update logic 208 may be one application included on the storage 206 of the EVSE 138. The EVSE update logic 208 may include instructions that, when executed by the processor(s) 204 of the EVSE 138, cause the EVSE 138 to request the software updates 148 from the update server 146, and provide the software updates 148 to the vehicle 112. Further aspects of the operation of the EVSE update logic 208 are discussed in detail with respect to FIG. 4.

Figure 3:
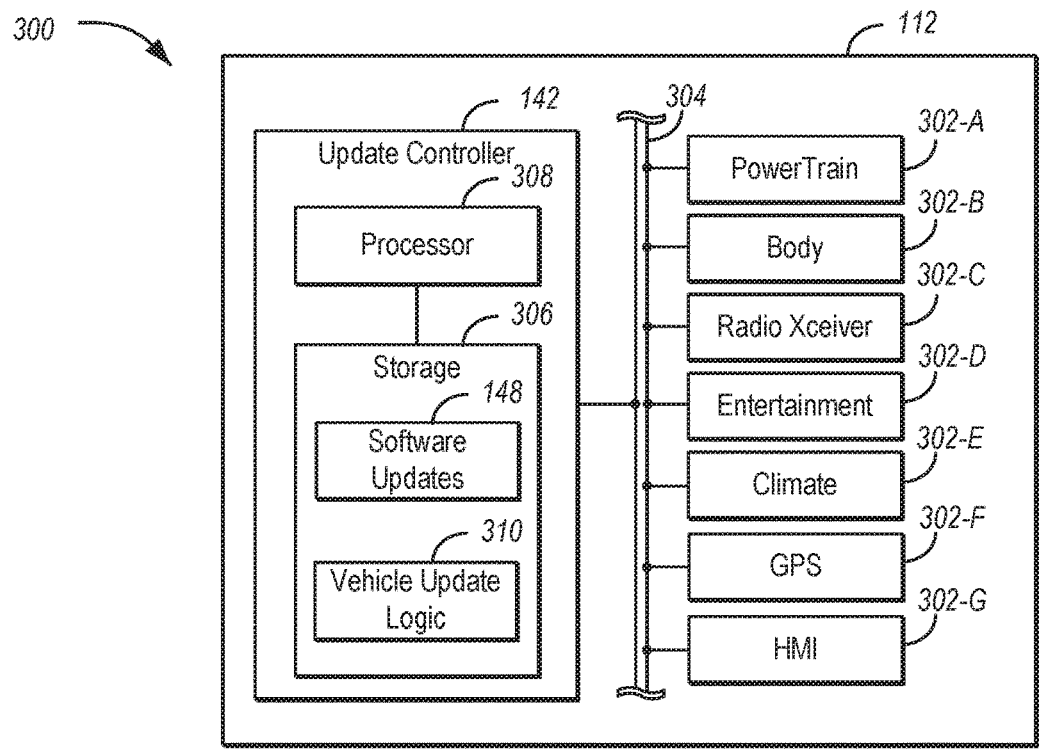
FIG. 3 illustrates further details of the vehicle.

FIG. 3 illustrates further details of the vehicle 112. As shown, the vehicle 112 may include a plurality of controllers 302 configured to perform and manage various vehicle 112 functions under the power of the vehicle batteries 124, 130 and/or drivetrain. As depicted, the example vehicle controllers 302 are represented as discrete controllers 302-A through 302-G. However, the vehicle controllers 302 may share physical hardware, firmware, and/or software, such that the functionality from multiple controllers 302 may be integrated into a single controller 302, and that the functionality of various such controllers 302 may be distributed across a plurality of controllers 302.

As some non-limiting vehicle controller 302 examples: a powertrain controller 302-A may be configured to provide control of engine operating components (e.g., idle control components, fuel delivery components, emissions control components, etc.) and for monitoring status of such engine operating components (e.g., status of engine codes); a body controller 302-B may be configured to manage various power control functions such as exterior lighting, interior lighting, keyless entry, remote start, and point of access status verification (e.g., closure status of the hood, doors and/or trunk of the vehicle 112); a radio transceiver controller 302-C may be configured to communicate with key fobs, mobile devices, or other local vehicle 112 devices; an entertainment controller 302-D may be configured to support voice command and BLUETOOTH interfaces with the driver and driver carry-on devices; a climate control management controller 302-E may be configured to provide control of heating and cooling system components (e.g., compressor clutch, blower fan, temperature sensors, etc.); a global positioning system (GPS) controller 302-F may be configured to provide vehicle location information; and a human-machine interface (HMI) controller 302-G may be configured to receive user input via various buttons or other controls, as well as provide vehicle status information to a driver, such as fuel level information, engine operating temperature information, and current location of the vehicle 112.

The vehicle bus 304 may include various methods of communication available between the vehicle ECUs 302, as well as between the update controller 142 and the vehicle ECUs 302. As some non-limiting examples, the vehicle bus 304 may include one or more of a vehicle controller area network (CAN), an Ethernet network, and a media oriented system transfer (MOST) network.

Also similar to the EVSE 138, the update controller 142 includes a storage 306 on which computer-executable instructions may be maintained and where the instructions may be executable by one or more processors 308. Such instructions and other data may be stored using a variety of computer-readable media. In an example, the update controller 142 may be configured to maintain software updates 148 to be provided to the vehicles 112.

A vehicle update logic 310 may be one application included on the storage 306 of the update controller 142. The vehicle update logic 310 may include instructions that, when executed by the processor(s) 308 of the update controller 142, cause the update controller 142 to utilize the powerline communication to request the software updates 148 from the EVSE 138, receive the software updates 148 over the powerline communication, and provide the software updates 148 over the vehicle bus 304 to the controllers 302 to be updated. Further aspects of the operation of the vehicle update logic 310 are discussed in detail with respect to FIG. 5.

FIG. 4 illustrates an example process 400 for providing cached software updates 148 from the EVSE 138 to the vehicle 112. In an example, the process 400 may be performed by the EVSE 138.

At operation 402, the EVSE 138 connects to the vehicle 112. In an example, the EVSE connector 140 may be plugged into a charge port 134 of the vehicle 112, and the processor 204 of the EVSE 138 may receive a signal from the charge port 134 indicating the connection. In some examples, the EVSE 138 and the vehicle 112 perform an association procedure to allow EVSEs 138 and vehicles 112 to identify one another when a vehicle 112 is plugged in.

At 404, the EVSE 138 receives version information from the vehicle 112. In an example, the EVSE 138 may send a message over the powerline connection requesting the vehicle 112 to provide version information for the connected vehicle 112. In other examples, the EVSE 138 may receive the vehicle version information from the vehicle 112 during or after completion of the association procedure of operation 402.

The EVSE 138 determines whether the vehicle 112 requires software updates 148 at operation 406. In an example, using the vehicle information the EVSE 138 may utilize the modem 202 to communicate via the network 144 to request for the update server 146 to indicate whether any software updates for the vehicle 112 are required. In some examples, the software updates 148 are identified to the EVSE 138 according to unique identifiers of the software updates 148 and/or by hash values or signatures corresponding to the software updates 148. If any software updates 148 are identified, control passes to operation 408. Otherwise, the process 400 ends.

At 408, the EVSE 138 determines whether any of the required software updates 148 have been cached by the EVSE 138 to the storage 206. In an example, the EVSE 138 queries the storage 206 for the unique identifiers, hash values, and/or signatures of the required software updates 148. If the software update(s) are stored to the storage 206, control passes to operation 410. If not, control passes to operation 412.

At operation 410, the EVSE 138 sends the software update(s) 148 to the vehicle 112. In an example, the EVSE 138 sends the software update(s) 148 over the powerline connection to the vehicle 112. Accordingly, the vehicle 112 receives the software update(s) 148 without requiring the user of network resources of the vehicle 112. After operation 410, the process 400 ends.

At operation 412, the EVSE 138 requests the software update(s) 148 from the update server 146. In an example, the EVSE 138 utilizes the modem 202 to receive the software updates 148 from the update server 146.

The EVSE 138 adds the software update(s) 148 to the storage 206 at 414. In an example, the EVSE 138 caches the retrieved software updates 148 in the storage 206 of the EVSE 138. Various caching methodologies may be utilized in the storage of the software updates 148. As one possibility, the software update(s) may be stored using a first-in-first-out methodology, such that the oldest software updates 148 are discarded from the storage 206 as space is required for new updates. As another possibility, the software update(s) may be stored using a least-recently-used methodology, such that the least recently used software updates 148 are discarded from the storage 206 as space is required for new updates. Accordingly, upon a next connection of the vehicle 112 to the EVSE 138 (e.g., the next time the user charges the vehicle 112), the retrieved software updates 148 may then be available for download to the vehicle as discussed above with respect to operation 410. After operation 414, the process 400 ends.

FIG. 5 illustrates an example process 500 for receiving cached software updates 148 from the EVSE 138 by the vehicle 112. In an example, the process 500 may be performed in whole or in part by the update controller 142 executing the vehicle update logic 310 by the one or more processors 308.

At operation 502, the vehicle 112 detects connection of the vehicle 112 to the EVSE 138. In an example, the EVSE connector 140 may be plugged into a charge port 134 of the vehicle 112, and the update controller 142 may receive a signal from the charge port 134 indicating the connection. In some examples, the EVSE 138 and the vehicle 112 perform an association procedure to allow EVSEs 138 and vehicles 112 to identify one another when a vehicle 112 is plugged in.

At 504, the vehicle 112 sends version information of the vehicle 112 to the EVSE 138. In an example, the update controller 142 queries for existence and version information for at least a portion of the hardware and software components of the vehicle 112. For instance, the update controller 142 may access the vehicle bus 304 to query the plurality of controllers 302 for information. As another possibility, the update controller 142 may identify and include additional information identifying the specific vehicle 112 (e.g., VIN information published on the vehicle bus 304). The update controller 142 may send the queried information to the EVSE 138 via the powerline connection of the vehicle 112 to the EVSE 138.

The vehicle 112 determines whether software updates 148 are available at the EVSE 138 for the vehicle 112 at 506. If the EVSE 138 determines that software updates 148 are available for the vehicle 112, the update controller 142 may receive a message over the powerline connection indicating the software updates 148 are to be installed or, in other cases, that there are software updates 148. Further aspects of the determination of whether software updates 148 are available is discussed in further detail with respect to the process 400.

At 508, the vehicle 112 receives the software update(s) 148. In an example, the update controller 142 receives the software update(s) 148 over the powerline connection from the EVSE 138. By use of the vehicle 112 to EVSE 138 physical connection, updating software of the vehicle 112 may be accomplished with minimal down time for the customer and no loss of connectivity features or functionality during the update. In some cases, the operations 506 are optional, and control may pass from operation 504 to operation 508 where vehicle 112 receives the software update(s) 148 without a separate notification message.

At operation 510, the vehicle 112 installs the software update(s) 148. In an example, the update controller 142 provides the software update(s) 148 over the vehicle bus 304 to the controller(s) 302 to be updated. After operation 510, the process 500 ends.

Variations on the systems and methods discussed above are possible. For instance, the communication between the vehicle 112 and the EVSE 138 may be performed over communications channels other than powerline communication. As some possibilities, the communication between the vehicle 112 and the EVSE 138, such as the transfer of software updates 148, may additionally or alternately be performed via a Wi-Fi, Ethernet, and/or CAN connection.

Computing devices described herein, such as the EVSE 138, update controller 142, update server 146, and controllers 302, generally include computer-executable instructions where the instructions may be executable by one or more computing devices such as those listed above. Computer-executable instructions, such as those of the EVSE update logic 208 and vehicle update logic 310, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric vehicle supply equipment (EVSE) comprising:
   a non-transitory storage;
   and a processor programmed to
      responsive to a powerline connection of a vehicle to the EVSE, receive vehicle version information indicative of whether the vehicle requires software updates that are downloaded to the storage,
      if so, send the software updates to the vehicle over the powerline connection, and
      if not, request the software updates over a wide-area network to a remote server to be cached in the storage for use in subsequent vehicle powerline connections,
      wherein the vehicle version information is sent during an association procedure configured to allow EVSEs and vehicles to identify one another when a vehicle is connected.

2. The EVSE of claim 1, wherein the processor is further programmed to discard software updates from the storage using a first-in-first-out cache methodology.

3. The EVSE of claim 1, wherein the processor is further programmed to discard software updates from the storage using a least-recently-used methodology cache methodology.

4. The EVSE of claim 1, wherein the vehicle version information includes software version information for a plurality of controllers of the vehicle.

5. The EVSE of claim 1, further comprising a modem configured to access the wide-area network using a cellular telephone network.

6. The EVSE of claim 1, further comprising a modem configured to access the wide-area network using a local-area wireless network.

7. A vehicle comprising: a processor programmed to responsive to vehicle association to electric vehicle supply equipment (EVSE) over a powerline connection to receive a first charge of a traction battery, send version information over the connection to cause the EVSE to download software updates to EVSE storage, the version information being sent during an association procedure configured to allow EVSEs and vehicles to identify one another when a vehicle is connected, reconnect to the EVSE to receive a second charge of the traction battery, and receive the software updates from the storage via the connection during the second charge.

8. The vehicle of claim 7, wherein the processor is further programmed to query a plurality of controllers of the vehicle over a vehicle bus to determine the version information.

9. The vehicle of claim 7, wherein the processor is further programmed to send the software updates over a vehicle bus to a controller of the vehicle to be updated.

10. A method comprising:
    responsive to a powerline connection of a vehicle to electric vehicle supply equipment (EVSE) for charging of the vehicle and receiving vehicle version information indicative of whether the vehicle requires software updates, the vehicle version information being sent during an association procedure configured to allow EVSEs and vehicles to identify one another when a vehicle is connected, requesting the software updates over a wide-area network to a remote server to be cached in a non-transitory storage of the EVSE for providing to vehicles during subsequent vehicle powerline connections.

11. The method of claim 10, further comprising:
    responsive to a subsequent powerline connection of the vehicle to the EVSE and receiving the vehicle version information indicative of whether the vehicle requires software updates that are downloaded to the storage, sending the software updates as cached to the storage to the vehicle over the powerline connection.

12. The method of claim 10, further comprising:
    responsive to a subsequent powerline connection of a second vehicle to the EVSE and receiving second vehicle version information indicative of whether the second vehicle requires software updates that are downloaded to the storage, sending the software updates as cached to the storage to the second vehicle over the powerline connection.

13. The method of claim 10, further comprising:
    identifying that the storage lacks capacity for the software updates, and
    discarding, from the storage, one or more software updates that are least recently added to the storage.

14. The method of claim 10, further comprising:
    identifying that the storage lacks capacity for the software updates, and
    discarding, from the storage, one or more software updates that are least recently used.

15. The method of claim 10, wherein the software updates include updates to a plurality of controllers of the vehicle.

* * * * *